United States Patent
Sugino et al.

(10) Patent No.: US 8,086,875 B2
(45) Date of Patent: Dec. 27, 2011

(54) STARTING DEVICE

(75) Inventors: Heiichi Sugino, Shinagawa (JP); Fujio Seki, Shinagawa (JP); Masato Ozawa, Shinagawa (JP); Keiji Miyatsu, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 776 days.

(21) Appl. No.: 11/905,840

(22) Filed: Oct. 4, 2007

(65) Prior Publication Data

US 2008/0244286 A1    Oct. 2, 2008

(30) Foreign Application Priority Data

Oct. 4, 2006    (JP) ................. 2006-273283

(51) Int. Cl.
- G06F 1/00 (2006.01)
- G06F 3/038 (2006.01)
- H01F 38/00 (2006.01)

(52) U.S. Cl. ........ 713/300; 713/330; 713/340; 323/355; 345/211

(58) Field of Classification Search .................. 713/300, 713/330, 340; 323/355; 345/211
See application file for complete search history.

(56) References Cited

U.S. PATENT DOCUMENTS

| | | | | |
|---|---|---|---|---|
| 3,962,611 A | * | 6/1976 | Miller | 361/194 |
| 5,767,844 A | * | 6/1998 | Stoye | 345/212 |
| 5,801,635 A | * | 9/1998 | Price | 340/656 |
| 6,125,449 A | * | 9/2000 | Taylor et al. | 713/310 |
| 6,147,616 A | * | 11/2000 | Kim | 340/657 |
| 6,256,682 B1 | * | 7/2001 | Gudan et al. | 710/14 |
| 6,272,630 B1 | * | 8/2001 | Chen et al. | 713/2 |
| 6,304,895 B1 | * | 10/2001 | Schneider et al. | 709/203 |
| 6,557,170 B1 | * | 4/2003 | Wilder et al. | 725/130 |
| 6,681,250 B1 | * | 1/2004 | Thomas et al. | 709/226 |
| 6,963,984 B2 | * | 11/2005 | Shiga | 713/310 |
| 7,519,749 B1 | * | 4/2009 | Sivertsen | 710/73 |
| 2005/0044184 A1 | | 2/2005 | Thomas et al. | |

FOREIGN PATENT DOCUMENTS

| | | |
|---|---|---|
| JP | 8-190526 | 7/1996 |
| JP | 10-224494 | 8/1998 |
| JP | 11-55854 | 2/1999 |
| JP | 2001-134346 | 5/2001 |
| JP | 2003-534685 | 11/2003 |

OTHER PUBLICATIONS

Office Action dispatched from the Japanese Patent Office in the corresponding Japanese patent application on Feb. 8, 2011.

* cited by examiner

*Primary Examiner* — Stefan Stoynov

(74) *Attorney, Agent, or Firm* — Staas & Halsey LLP

(57) ABSTRACT

A starting device includes a first transform device that restores a first transfer signal, which is converted from an input signal supplied from an input device, to the input signal, and outputs the input signal to a computer, and a power connecting device that starts the computer when the input signal restored by the first transform device includes a starting signal.

5 Claims, 4 Drawing Sheets

STARTING DEVICE

BACKGROUND OF THE INVENTION

1. Field of the Invention

The present invention generally relates to starting devices, and more particularly, to a starting device that powers on a computer when an input signal from an input device includes a starting signal.

2. Description of the Related Art

Generally, a computer can be started by manipulating its power switch directly, so the starting operation is carried out at a place where the computer is. There is another technique to start the computer by remote control. Japanese Patent Application Publication No. 8-190526 (Document 1) shows a technique to start a host machine with remote terminal equipment through a data communication network. Japanese Patent Application Publication No. 10-224494 (Document 2) shows a technique to start a host machine with remote terminal equipment through a public telephone network. Japanese Patent Application Publication No. 2001-134346 (Document 3) shows a technique to start a computer by a signal of peripheral equipment through a connecting cable.

For example, the techniques disclosed in Documents 1 and 2 are achieved by having a terminal computer at the remote place, so systems become very expensive. The technique disclosed in Document 3 uses the cable for connecting the peripheral equipment and the computer, and it is therefore difficult to realize a long distance and operate the computer by remote control. In addition, the cables are expensive.

SUMMARY OF THE INVENTION

The present invention has been made in view of the above circumstances and provides a starting device capable of starting a computer from a remote place with a simple and inexpensive system.

The present invention is achieved by a starting device including: a first transform device that restores a first transfer signal, which is converted an input signal from a input device to, to the input signal, and outputs the signal to the computer; and a power connecting device that starts the computer if the restored input signal includes a starting signal. The present invention enables to start a computer by remote control with a simple and inexpensive system not using a terminal computer.

The above system of the present invention is also achieved by a system, wherein the power connecting device starts the computer with an automatic restarting function of the computer. The system enables to start a computer easily.

The above system of the present invention is also achieved by a system, wherein the power connecting device is placed between the computer and power, and starts the computer with providing power supply after temporarily cutting power supply to the computer. The system enables to start a computer by an automatic restarting function.

The above system of the present invention is also achieved by a system including: a switching device that connects not less than one of the first transfer signals from the input devices to the first transform device accepting not less than one of the computers. The system enables to start multiple computers by a single input device.

The above system of the present invention is also achieved by a system including a second transform device that transforms the input signal to the first transfer signal.

The above system of the present invention is also achieved by a system, wherein the first transform device transforms the image signal outputted from a computer to display the image on a display device; and the second transform device restores the second transfer signal to the image signal, and outputs the signal to the display device.

The above system of the present invention is also achieved by a system, wherein the input device is either or both a keyboard and a mouse.

The present invention makes it possible to provide a starting device capable of starting a computer by remote control with a simple and inexpensive system.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

A description will now be given of embodiments of the present invention with reference to the accompanying drawings.

First Embodiment

Figure 1:
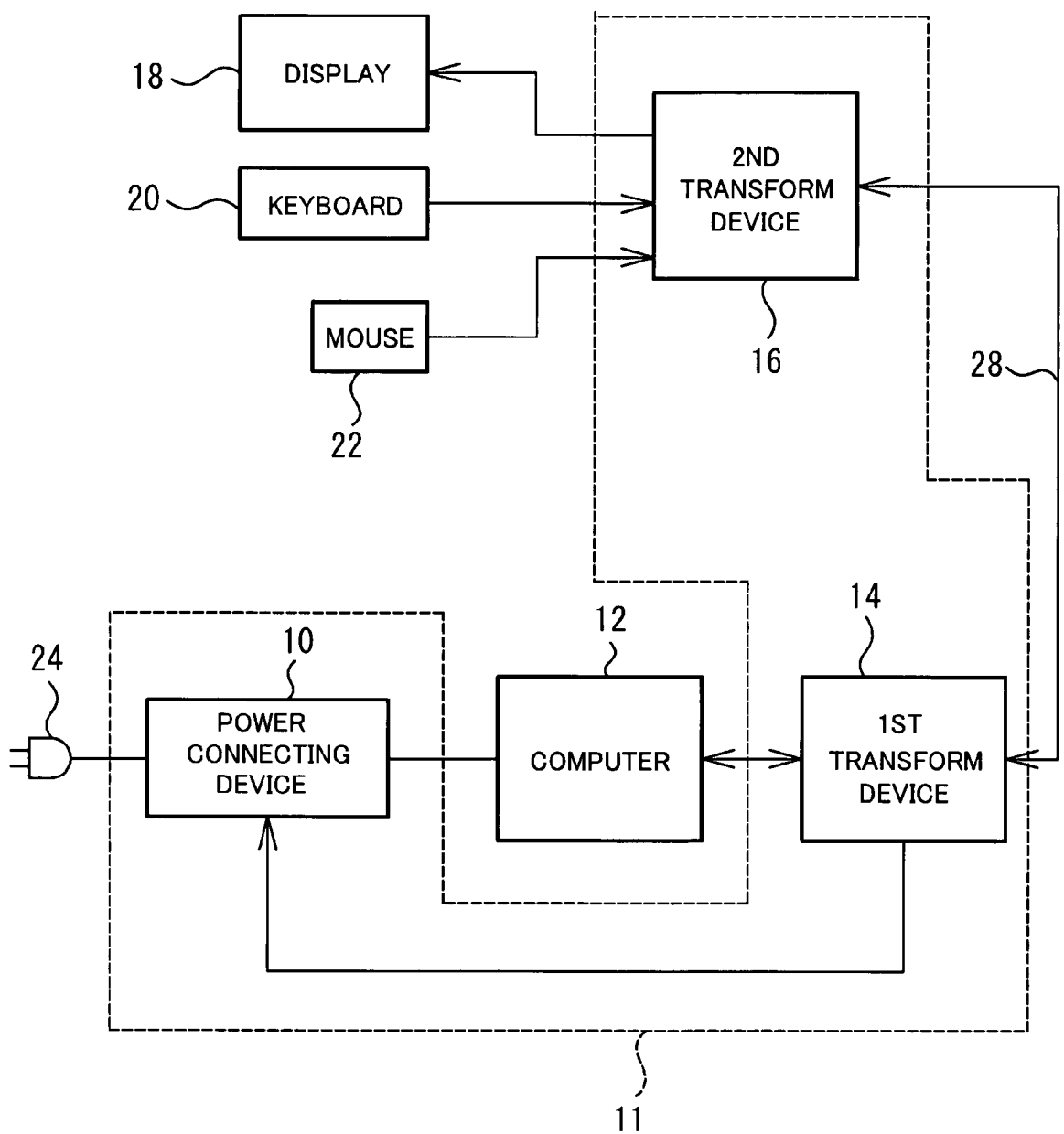
FIG. 1 is a block diagram of a system including a starting device in accordance with a first embodiment of the present invention.

In the first embodiment, a computer (a server, for example) has an automatic restarting function. The automatic restarting function is the function that automatically restarts a computer when the power comes back from a power failure like a blackout. In other words, the automatic restarting function is the function that automatically restarts a computer when the computer is connected to an AC (Alternating Current) source after power supply from AC source is cut off. FIG. 1 is a block diagram of a system that includes a starting device in accordance with the first embodiment of the present invention. In FIG. 1, there are illustrated a computer 12, a display device 18, a keyboard 20, a mouse 22, a starting device 11, a power 24 and a cable 28. The starting device 11 includes a first transform device 14, a second transform device 16 and a power connecting device 10.

The keyboard 20 and the mouse 22 are input devices to put input signals into the computer 12. The display device 18 shows an image based on an image signal output from the computer 12. The first transform device 14 restores a first transfer signal, which is converted from an input signal, to the input signal, and outputs the signal to the computer. In addition, the first transform device 14 converts an image signal from the computer 12 to a second transfer signal, and outputs the converted signal to the second transform device 16. The second transform device 16 converts an input signal from the keyboard 20 or the mouse 22 to the first transfer signal. The second transform device 16 also converts the second transfer signal to an image signal again, and outputs the converted signal to the display device 18. The cable 28 connects the first transform device 14 and the second transform device 16, and transfers the first transfer signal and the second transfer signal. The power connecting device 10, which is placed between the computer 12 and the power source 24, connects or disconnects the computer 12 and the power source 24 by an order of the first transform device 14. The system mentioned above enables to control the computer 12 from a remote, using the keyboard 20, the mouse 22 and the display device 18.

Figure 2:
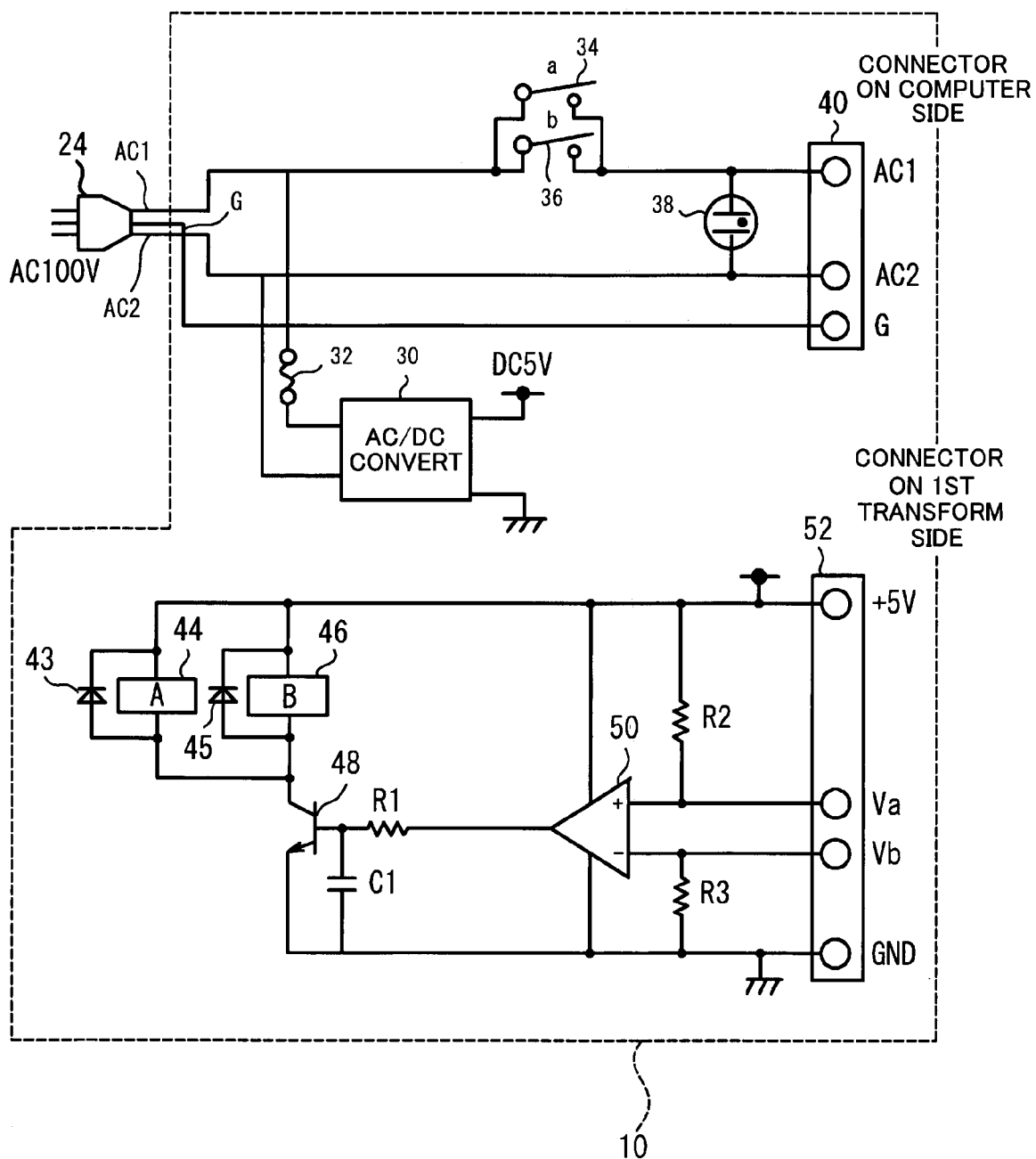
FIG. 2 is a circuit diagram of a power connecting device.

FIG. 2 is a circuit diagram of the power connecting device 10. Ground terminals G, AC1 and AC2 in an AC 100V outlet are connected to ground terminals G, AC1 and AC2 in the computer 12 with a computer-side connector 40, respectively. The line of AC1 has a switch a34 and a switch b36. As the switch a34 and the switch b36 are connected and disconnected, power supply for the computer 12 is connected and disconnected. The switch a34 and the switch b36 are geminated for each other's backup. A neon bulb 38 is placed between AC1 and AC2, and emits light when the power is supplied for the computer 12. AC1 and AC2 are converted to a DC (Direct Current) voltage of 5 V through a fuse 32 and an AC/DC converter 30. The DC 5V is supplied to the first transform device 14 and the circuit mentioned below.

Outputs Va and Vb from the first transform device 14 are input to a comparator 50 through a first-transform-device-side connector 52. The comparator 50, which may, for example, be an RS-485 receiver, outputs the high level when Va-Vb is positive and outputs the low level when Va-Vb is negative. The output of the comparator 50 is applied to a base of a drive transistor 48. The drive transistor 48 applies current to a coil A44 and a coil B46 when the output of the comparator 50 is at the high level. The coil A44 drives the switch a34 and the coil B46 drives the switch b36. In other words, when Va-Vb is positive, the comparator 50 outputs the high level. Thus, currents flow through the coils A44 and B56, and the switches a34 and b36 are turned on, so that the computer 12 can be connected to the AC source. In contrast, when Va-Vb is negative, the switch a34 and switch b36 are turned off, and the computer 12 is disconnected from the AC source.

Figure 3:
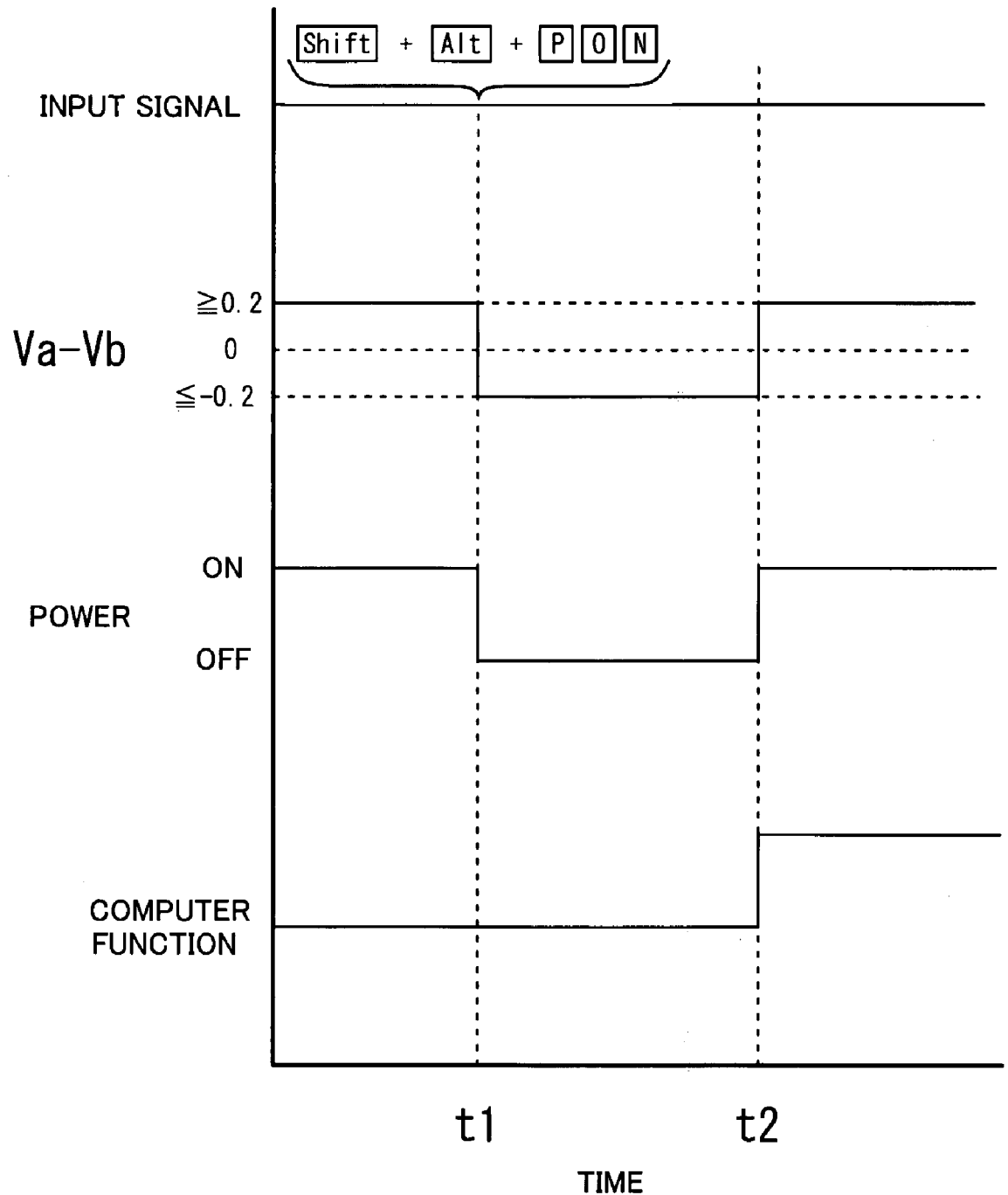
FIG. 3 is a timing chart of a starting device.

FIG. 3 is a timing chart of the starting device 11. When the computer 12 is in the stopped state, Va-Vb is equal to or higher than 0.2 V and the power connecting device 10 supplies AC power to the computer 12. At a time t1, the first transform device 14 detects a starting signal. More specifically, an input signal that is restored from the first transfer signal includes the starting signal. The starting signal includes, for example, a signal corresponding to "Shift+Alt+P, O, N" from the keyboard 20. The first transform device 14 outputs a signal to the power connecting device 10 to make Va-Vb equal to or lower than −0.2 V. As has been explained with FIG. 2, the power connecting device 10 re-supplies AC power to the computer 12. The computer 12 starts with the automatic restarting function. The delay between the times t1 and t2 can be set equal to a few seconds, for example.

The first embodiment is configured so that the second transform device 16 makes a first transfer signal that can be transferred far away, from the input signal that the input device like the keyboard 20 or the mouse 22 outputs. The first transform device 14 restores the first transfer signal to the input signal and outputs the signal to the computer 12. In the case where the input signal includes the starting signal, the power connecting device 10 starts the computer 12. For example, the cable 28 may include a LAN (Local Area Network) cable like a Cat 5 cable through which the first transfer signals are transferred. This arrangement does not need the terminal equipment described in Patent Documents 1 and 2. In addition, the present embodiment doe not use the cable that is hard to be used for long distance transmission disclosed in Patent Document 3, for example USB (Universal Serial Bus) cable, and enables to start the computer 12 by remote control. Furthermore, the present embodiment may be accomplished inexpensively because the computer 12 can be controlled through only the cable 28 even when there are several input devices.

The power connecting device 10 starts the computer 12 with the automatic restarting function of the computer 12. The first transfer signal is transferred over the cable 28. The power connecting device 10 is placed between the computer 12 and the power 24, and starts the computer 12 with providing power supply after temporarily cutting power supply to the computer 12. The power connecting device 10 can also start the computer 12 by turning on a starting switch of the computer 12. However, this case needs to place a relay switch for turning on the starting switch electrically. Using the automatic restarting function employed in the first embodiment enables to start the computer easily by remote control without changing the hardware architecture of the computer.

The first transform device 14 transforms an image signal output from the computer 12 to the second transfer signal, and outputs the signal to the second transform device 16 in order to display an image on the display device 18. The second transform device 16 restores the second transfer signal to the image signal, and outputs the signal to the display device 18. As mentioned above, the cable 28 can also transfer image signals.

Using either or both of the keyboard 20 and the mouse 22 for the input device, operations with the keyboard 20 and the mouse 22 make it easy to output the starting signal. For example, a button can be used as the input device besides the keyboard 20 and the mouse 22. But this case needs to add an element like a button besides the keyboard 20 and the mouse 22.

Figure 4:
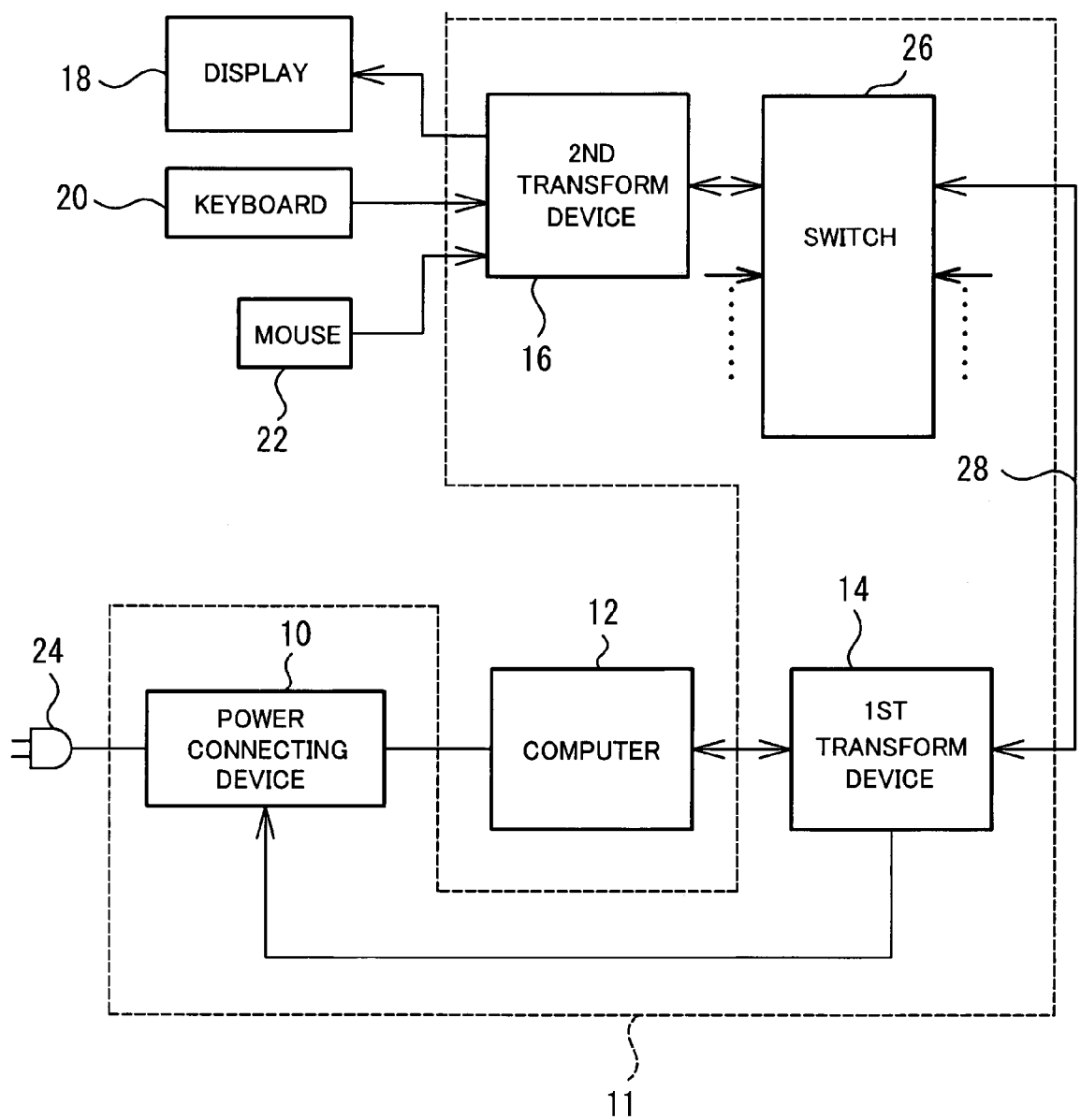
FIG. 4 is a block diagram of a system including a starting device in accordance with a second embodiment.

A second embodiment is an exemplary case having a switching unit. FIG. 4 is a block diagram of a system that includes a starting device in accordance with the second embodiment of the present invention. The starting device 11 has a switching device 26 in addition to the first embodiment shown in FIG. 1. The switching device 26 connects at least one of the first transfer signals from the several keyboards 20 and the several mice 22 to the first transform device 14 associated with a corresponding one of the computers. The second transform device 16 transforms the image signal output from the keyboard 20 or the mouse 22 to the first transfer signal, and provides the switching device 26 with information that indicates which one of the computers 12 the switching device 26 should be connected to. Since the other compositions are the same as those described in the first embodiment, a detailed description thereof is omitted.

The second embodiment enables to control several computers by a single input device. In addition, it is possible to start several computers by the single input device.

The present invention is not limited to the specifically disclosed embodiments, but may include other embodiments and variations within the scope of the matters described in the claims of the present invention.

The present invention is based on Japanese Patent Application No. 2006-273283 filed on Oct. 4, 2006, the entire disclosure of which is hereby incorporated by reference.

What is claimed is:

1. A starting device, comprising:
a first transform device that receives a first transfer signal, which is converted from an input signal supplied from an input device, via a LAN cable and that restores the first transfer signal to the input signal, and outputs the input signal to a computer having an automatic restarting function; and
a power connecting device that starts the computer by stopping supplying power to the computer from an AC power source for a predetermined time and then restarting supplying power to the computer from the AC power source when the input signal restored by the first transform device includes a starting signal, the power connecting device including a comparator that compares a first output and a second output from the first transform device, outputs a high level when the comparison is positive such that the computer is connected to the AC power source, and outputs a low level when the comparison is negative such that the computer is disconnected from the AC power source, the power connecting device being placed between the computer and the AC power source, wherein the automatic restarting function automatically restarts the computer when power is restored after a power failure.

2. The starting device as claimed in claim 1, further comprising a switching device that connects at least one of first transfer signals from input devices to the first transform device that is associated with at least one of computers.

3. The starting device as claimed in claim 1, further comprising a second transform device that transforms the input signal to the first transfer signal.

4. The starting device as claimed in claim 3, wherein:
the first transform device transforms an image signal output from the computer to a second transfer signal and supplies the second transfer signal to the second transform device in order to display an image on a display device; and
the second transform device restores the second transfer signal to the image signal, and outputs the image signal thus restored to the display device.

5. The starting device as claimed in claim 1, wherein the input device includes at least one of a keyboard and a mouse.

* * * * *